United States Patent [19]
Furuta

[11] Patent Number: 5,878,239
[45] Date of Patent: Mar. 2, 1999

[54] METHOD AND APPARATUS FOR PROCESSING A TARGET RETRY FROM A PCI TARGET DEVICE TO AN ISA MASTER DEVISE USING A PCI/ISA BRIDGE

[75] Inventor: Shinichi Furuta, Tokyo, Japan

[73] Assignee: Kabushiki Kaisha Toshiba, Kawasaki, Japan

[21] Appl. No.: 705,316

[22] Filed: Aug. 29, 1996

[30] Foreign Application Priority Data

Sep. 8, 1995 [JP] Japan .................................. 7-231617

[51] Int. Cl.$^6$ ........................................................ G06F 13/00
[52] U.S. Cl. .................................... 395/309; 395/308
[58] Field of Search .................................. 395/306–309, 395/287

[56] References Cited

U.S. PATENT DOCUMENTS

| 5,418,914 | 5/1995 | Heil et al. | 395/293 |
| 5,442,754 | 8/1995 | Datwyler et al. | 395/308 |
| 5,546,546 | 8/1996 | Bell et al. | 395/292 |
| 5,553,248 | 9/1996 | Melo et al. | 395/296 |
| 5,566,340 | 10/1996 | Stewart et al. | 395/750.05 |
| 5,572,734 | 11/1996 | Narad et al. | 395/726 |
| 5,603,050 | 2/1997 | Wolford et al. | 395/287 |
| 5,613,075 | 3/1997 | Wade et al. | 395/287 |
| 5,673,400 | 9/1997 | Kenny | 395/309 |

FOREIGN PATENT DOCUMENTS

| 3-48962 | 3/1991 | Japan . |
| 4-199254 | 7/1992 | Japan . |

OTHER PUBLICATIONS

PCI Local Bus Specification, PCI Special Intrest Group, Revision 2.1 (1995).
PCI Local Bus Specification, PCI Special Intrest Group, Revision 2.0 (1995).
"Peripheral Components," Intel, pp. 3–33 –3–50, 1993.
"Mobile PC/PCI DMA Arbitration and Protocols," Intel Corporation, Apr., 1996, Revision 2.2, pp. 1–27.

*Primary Examiner*—Meng-Ai T. An
*Assistant Examiner*—Sumati Lefkowitz
*Attorney, Agent, or Firm*—Finnegan, Henderson, Farabow, Garrett & Dunner, L.L.P.

[57] ABSTRACT

When an ISA bus master on an external ISA bus tries to access a device on a PCI bus, a desk station-PCI/ISA (DS-PSI/ISA) bridge device converts a bus cycle on the ISA bus to a PCI bus cycle and commences a transaction for accessing a PCI device. At this time, if the target address-specified by the transaction cannot respond to the transaction and a target retry is generated by the target, the DS-PCI/ISA bridge device activates an I/O channel ready signal (IOCHRDY) on the external ISA bus. The ISA bus master is in a wait state. The DS-PCI/ISA bridge automatically retries the transaction after a predetermined time has elapsed.

21 Claims, 5 Drawing Sheets

METHOD AND APPARATUS FOR PROCESSING A TARGET RETRY FROM A PCI TARGET DEVICE TO AN ISA MASTER DEVISE USING A PCI/ISA BRIDGE

FIELD OF THE INVENTION

This invention relates to a computer system, and in particular, concerns a computer system having a function for instructing a target retry and conclusion of the transaction with respect to a bus master which has commenced a transaction.

BACKGROUND OF THE INVENTION

Standard system buses, such as ISA (Industry Standard Architecture) and EISA (Extended ISA) buses, are conventionally used in personal computers. Another standard bus, PCI (Peripheral Component Interconnect) bus, is commonly employed in desktop-type personal computers to increase the speed of data transfer and organize system architecture, independently of the kind of processors.

In a PCI bus, block transfer is the basis of substantially all data transfer. Transfer of each block is executed by burst transmission. For example, a maximum data transfer speed of 133 megabytes/sec. can be used on a data bus having a width of 32 bits.

Therefore, when a PCI bus is used, data transfer between I/O devices and between a system memory and an I/O device is executed at high speed. As such, system performance is increased.

Recently, PCI busses are used not only in desktop type personal computers, but also in portable personal computers, such as notebook-type computers.

In this type of PCI bus system architecture, a bridge LSI for connecting a PCI bus and an ISA bus is provided, and it bi-directionally converts bus cycles between the PCI bus and the ISA bus.

There are no problems where the bridge LSI operates as a bridge for converting bus cycles from the PCI bus to the ISA bus, but where it operates as a bridge for converting bus cycles from the ISA bus to the PCI bus (i.e. where an ISA I/O device operates as a bus master to access a device on the PCI bus), there is the danger that access by the ISA bus master cannot be correctly executed due to a target retry which is one characteristic of PCI bus system architecture.

Target retry is an inherent PCI device function in PCI bus systems, and is performed in the following manner.

In a PCI bus system, where a target address-specified by a transaction on a PCI bus cannot correspond to the transaction, notification is given of a retry and transaction conclusion to an initiator which commenced the transaction, i.e. a PCI bus master. This type of target retry occurs when a device specified as the target is locked due to exclusive access by another PCI bus master, when exclusively used under OS management. The PCI bus master notified of the retry must release the PCI bus. The operation of a PCI bus master to which a target retry is notified is illustrated in FIG. 1.

A PCI bus master outputs a bus access request signal REQ# to a PCI bus arbiter to request bus access. The PCI bus master waits until having been granted a signal GNT# indicating bus access enable from the PCI bus arbiter. Upon receiving a GNT#, the PCI bus master activates a frame signal FRAME# and commences a transaction.

At this time, where a target specified by the address outputted from the PCI bus master cannot respond to the transaction, a target activates a target ready signal TRDY#, a stop signal STOP# and a device select signal DEVSEL# on the PCI bus as "H", "L" and "L" as shown in FIG. 1, whereby the PCI bus master is notified of a target retry.

The PCI bus master makes the REQ# inactive, invalidates the GNT# and temporarily releases the PCI bus. Thereby, another bus master can use the PCI bus. When a fixed time period has lapsed after notification of the target retry, the PCI bus master retries the same transaction again. If a target retry is not generated in this transaction, the data transfer between the PCI bus master and the target is executed correctly. All of the necessary data transfer has been completed, the PCI bus master makes the REQ# inactive and releases the PCI bus.

However, there is no concept of target retry in the ISA bus system. In the ISA bus system, if the ISA bus cycle must finish midway, the same cycle does not occur again.

Hence, when an ISA bus master has commenced a bus cycle for accessing a device on the PCI bus, and once the above described target retry has been generated, the ISA bus master cannot correctly execute the necessary data write/read.

SUMMARY OF THE INVENTION

The object of this invention is to provide an improved bridge LSI for connecting a PCI bus and an ISA bus.

Another object of this invention is to provide a computer system with high operational reliability which can prevent misoperation of an ISA bus master arising from the occurrence of a target retry.

In accordance with the present invention, the foregoing objects, among others, are achieved by providing a computer system comprising a first bus, a second bus, a bridge device connected to the first bus and the second bus for converting a bus cycle executed by an agent on the second bus into a transaction in order to access a target on the first bus, wait means coupled to the bridge device for setting the agent in a wait state when a target retry is notified by the target on the first bus, and retry means coupled to the bridge device for retrying the transaction after a lapse of a predetermined time from retry notification.

There also has been provided, in accordance with yet another aspect of the present invention, a method of processing a target retry from a target on a PCI bus, when a bus master on an ISA bus accesses the target on the PCI bus through a bridge device, connected to the first bus and the second bus, for converting a bus cycle executed by the bus master into a transaction. The method comprises the steps of commencing a transaction to access a target on the PCI, setting the bus master in a wait state when the target retry is notified by the target, and retrying the transaction after a lapse of a predetermined time from retry notification.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
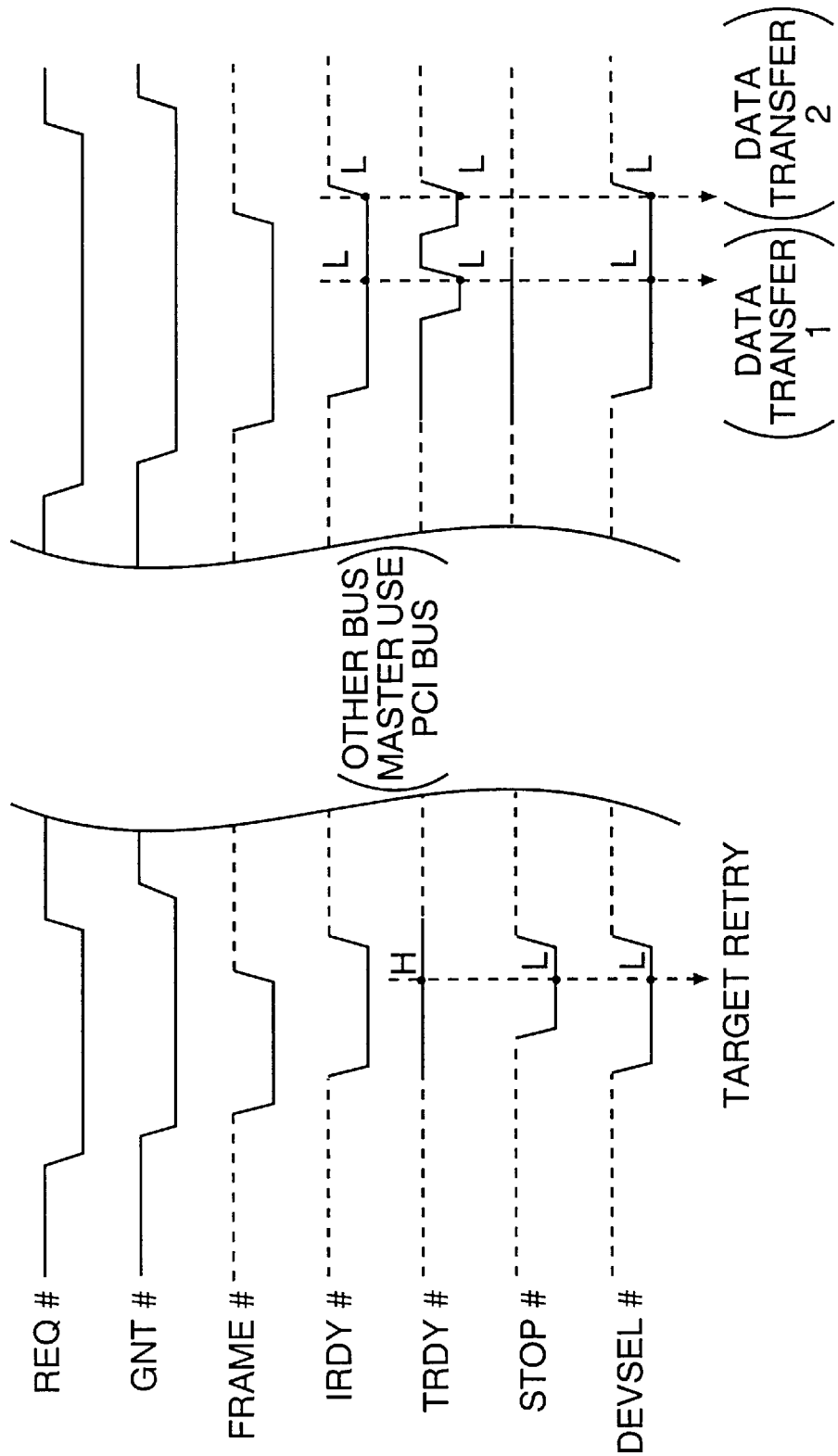
FIG. 1 is a timing chart to explain an operation of a target retry executed by a PCI bus master.
Figure 2:
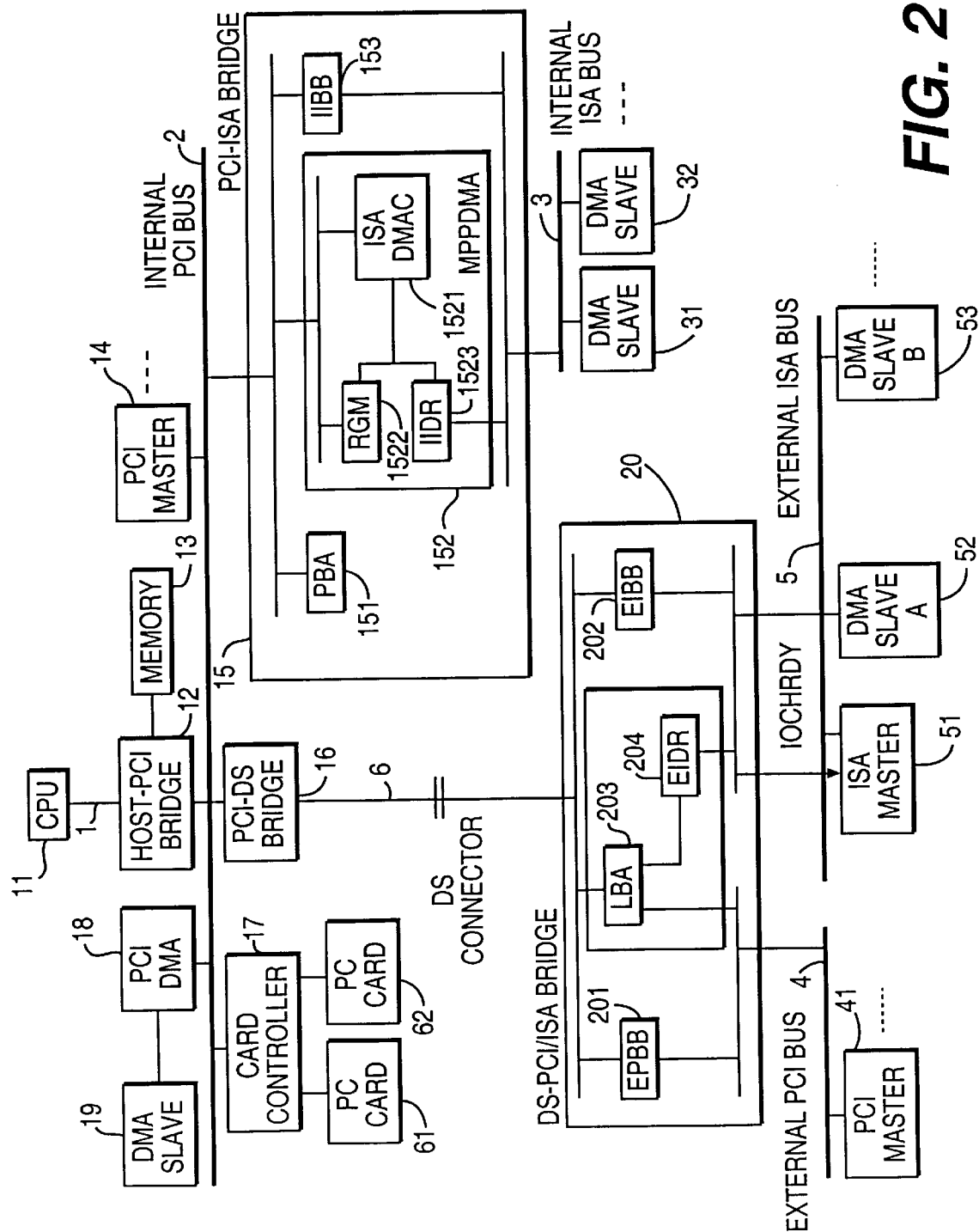
FIG. 2 is a schematic block diagram of a portable computer in accordance with one embodiment of this invention.

FIG. 2 shows the structure of a computer system, according to an embodiment of this invention. This computer system is preferably a notebook type or laptop type portable computer. As shown in FIG. 2, three types of buses, i.e. a processor bus 1, an internal PCI bus 2 and an internal ISA bus 3, are arranged on the system board thereof. An external PCI bus 4 and an external ISA bus 5 are arranged in a desk station connected to a DS connector of the portable personal computer.

A CPU 11, a host/PCI bridge device 12, a system memory 13, various types of PCI master devices 14, an internal PCI-ISA bridge device 15, a PCI-DS (DS: desk bridge device 16, a PC card controller 17, a DMA device 18 are provided on the system board. Also, a DS-PCI/ISA bridge device 20 is provided in the desk station.

The system board provides a CPU 11, a host/PCI bridge device 12, a system memory 13, various types of PCI master devices 14, an internal PCI-ISA bridge device 15, a PCI-DS (DS: desk station) bridge device 16, a PC card controller 17, and a PCI DMA 18. Also, a DS-PCI/ISA bridge device 20 is provided in the desk station.

CPU 11 is preferably a "Pentium" microprocessor produced and marketed by the Intel Company. Processor bus 1 is directly connected to input/output pins of CPU 11 and preferably has a 64-bit data bus.

System memory 13 is a memory device for storing an operating system, device drivers, application programs to be executed, and data for processing. System memory 13 is preferably formed by a plurality of DRAMs. System memory 13 is connected to host/PCI bridge device 12 via a memory bus having a 32-bit or 64-bit data bus. Processor bus 1 serves as a data bus for the memory bus. In such a case, the memory bus is formed by an address bus and various types of memory control signal lines.

Host/PCI bridge device 12 is a bridge LSI for coupling processor bus 1 and internal PCI bus 2, and functions as one bus master of a PCI bus. Host/PCI bridge device 12 can directionally convert bus cycles including data and addresses, can control access of system memory 13 via a memory bus, between processor bus 1 and internal PCI bus 2, and can provide locking for exclusively using system memory 13. This locking function is used by the bus master and CPU 11, etc. on a PCI bus.

Internal PCI bus 2 is a clock-synchronization type input/output bus. All cycles on internal PCI bus 2 are synchronized with a PCI bus clock. Clock speed of internal PCI bus 2 is preferably no greater than 33 MHz. Internal PCI bus 2 has an address/data bus used in a time division manner. This address/data bus has a width of 32 bits.

A data transfer cycle on internal PCI bus 2 is formed from an address phase and one or more data phases following thereafter. An address and transfer type are output in the address phase. 8-bit, 16-bit, 24-bit or 32-bit data are output in the data phases.

A Lock signal LOCK# defined on internal PCI bus 2 indicates whether the access to the device specified as the target of the data transfer is exclusively executed or not. That is, if the LOCK# signal is active, the access is in a state of a resource lock. The access to some target devices other than targets locking exclusively being used is permitted by other bus masters.

Moreover, if the target device cannot respond to a present transaction (an address phase and a data phase), a target retry is generated by the target device. That is, the target retry of the transaction and the releasing of a PCI bus are ordered to the bus master which began the transaction.

PCI master device 14 is one bus master of internal PCI bus 2 as well as host/PCI bridge device 12, and operates as an initiator or target. All devices on internal PCI bus 2 work as a target even without functioning as the bus master. The term "target" means the resource whose address is specified by an initiator, preferably a bus master, that began a transaction.

Internal PCI-ISA bridge device 15 is a bridge LSI for coupling internal PCI bus 2 and internal ISA bus 3, and functions as one bus master of internal PCI bus 2.

Host-PCI bridge device 12 bi-directionally converts bus cycles including data and addresses between internal PCI bus 2 and internal ISA bus 3. A memory 13 and a plurality of ISA I/O devices 31,32 are connected to internal ISA bus 3. These ISA I/O devices are devices for requesting DMA transfer to ISA DMAC 1521 incorporated in internal PCI-ISA bridge device 15, i.e. a DMA slave.

PCI bus arbiter (PBA) 151, DMAC core (MPPDMA) 152 and internal ISA bus bridge (IIBB) 153 are incorporated in internal PCI-ISA bridge device 15.

PCI bus arbiter (PBA) 151 arbitrates bus accesses between all bus master devices connected to internal PCI bus 2. In this arbitration, signal lines (a bus request signal REQ# line and a grant signal GNT# line) on internal PCI bus 2 are allocated in one pair to each bus master device.

A bus request signal REQ# is a signal for notifying PCI bus arbiter (PBA) 151 of a request from a device corresponding therewith to use internal PCI bus 2. A grant signal GNT# is a signal for notifying the device that issued a bus request signal REQ# that it has accessed internal PCI bus 2.

Also, in this system, among the plurality of groups of REQ# and GNT# lines defined on internal PCI bus 2, one REQ# and GNT# line group allocated to DS-PCI/ISA bridge device 20 is used for a DMA serial channel protocol for transmission and reception of DREQs and DACK#s between DMA slaves connected to external ISA bus 5.

All of the bus request signal REQ# lines and grant signal GNT# lines on internal PCI bus 2 are connected to PCI bus arbiter (PBA) 151. Arbitration of bus access right is controlled by PCI bus arbiter (PBA) 151.

DMAC core (MPPDMA) 152 is formed from the three blocks of an ISA DMAC 1521, a bus request and grant manager (RGM: REQ#, GNT# manager) 1522, and an internal ISA DMA router (IIDR) 1523. DMAC core (MPPDMA) 152 is an independent function block within internal PCI-ISA bridge device 15. Only other blocks operate functions other than DMA, DMAC core (MPPDMA) 152 not being used.

Figure 3:
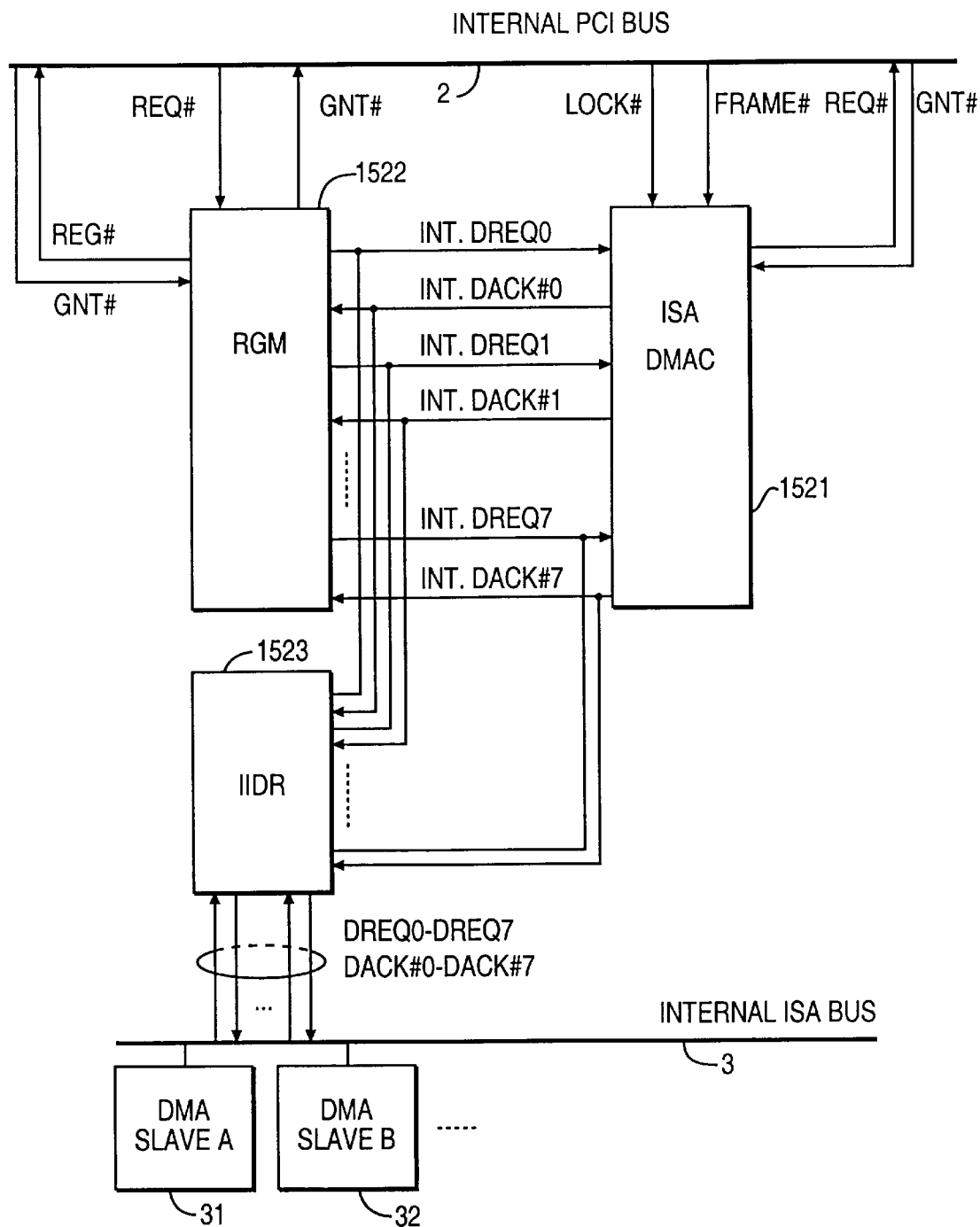
FIG. 3 is a schematic block diagram of a DMAC core in the computer system shown in FIG. 2.

The specific connections of ISA DMAC 1521, request and grant manager (RGM) 1522 and internal ISA DMA router (IIDR) 1523 are illustrated in FIG. 3.

ISA DMAC 1521 is connected to internal PCI bus 2, and executes DMA transfer, according to a request from a DMA slave device requiring DMA transfer.

DMA slaves are logically connected to internal PCI bus 2. In most cases, they are connected to internal ISA bus 3 or external ISA bus 5 through a bridge 15 or 20.

ISA DMAC 1521 has a DREQ input port where internal DREQs 0 to 7 are input and a DACK# output port for outputting internal DACK#s 0 to 7. Both the DREQ input ports and the DACK# output ports are connected to RGM 1522 and IIDR 1523. Transmission and reception of DREQs and DACK#s between the DMA slaves 31,32, . . . and ISA DMAC 1521 on internal ISA bus 3 are executed via IIDR 1523. Also, transmission and reception of DREQs and DACK#s between a ISA master 51 and DMA slaves 52,53 on external ISA bus 5 and ISA DMAC 1521 are performed by DMA serial channel protocol via RGM 1522.

Since ISA DMAC 1521 is connected to internal PCI bus 2 and devices requesting DMA transfer are connected to internal ISA bus 3 or external ISA bus 5, a read cycle (I/O read or memory read) and a write cycle (memory write or I/O write) are not generated simultaneously in DMA transfer by ISA DMAC 1521. That is, first, a read cycle is performed, after which the read data at that time are latched to a buffer in ISA DMAC 1521. Next, a write cycle is executed and the previously latched data are output as write data.

ISA DMAC 1521 generates both a read cycle and a write cycle on internal PCI bus 2, irrespective of whether they are memory or I/0. Further, the bridge device 15 or 20 converts a bus cycle on internal PCI bus 2 to an ISA bus cycle. Namely, ISA DMAC 1521 generates both memory cycles and DMA exclusive I/O cycles on internal PCI bus 2 and is not concerned with ISA bus cycles.

ISA DMAC 1521 has preferably one 82C37 compatible function, which is the ISA bus system architecture standard, and supports DMA channels CH0 to CH7 by means of internal DREQs 0 to 7 and internal DACK#s 0 to 7. Among these channels, because DMA channel CH4 is used to cascade-connect two DMAC controllers, it is not used for DMA transfer. As a result, DREQ4 and DACK#4 among the internal DREQs 0 to 7 and internal DACK#s 0 to 7 are actually not connected to either RGM 1522 or IIDR 1523.

ISA DMAC 1521 performs arbitration of DMA channels by using the internal DREQs 0 to 7 and internal DACK#s 0 to 7 prepared in one pair each for every DMA channel. An internal DREQ is a DMA request signal used to notify ISA DMAC 1521 that a DMA slave is requesting execution of DMA transfer. A DACK# is a DMA acknowledgment signal by which ISA DMAC 1521 notifies commencement of DMA cycle execution of a DMA slave which has requested DMA transfer. The DMA slave which is the subject of DMA transfer is selected by this DACK#.

Allocation of the DMA channels is exclusively performed between devices on internal ISA bus 3 and devices on external ISA bus 5. Each device transmits to and receives from ISA DMAC 1521 the DREQ and DACK# corresponding to the DMA channel allocated thereto.

In this case, transmission and reception of the DREQ and DACK# between external ISA bus 5 and ISA DMAC 1521, as described above, are executed, according to the DMA serial channel protocol by using one group of serial REQ# and serial GNT# signal lines. Hereafter, they are referred to as serial REQ# and serial GNT#.

The DMA serial channel protocol can decrease the number of signal lines that should be derived to the desk station, and use both a PCI expansion card and a ISA expansion card in the desk station.

In this DMA serial channel protocol, the most recent DREQ state is transmitted from DS-PCI/ISA bridge device 20 by a serial REQ#. This is sent to RGM 1522. In RGM 1522, the serial REQ# is converted to internal DREQs 0 to 7 for ISA DMAC 1521.

Further, channel information of DMA transfer indicated by the internal DACK#s 0 to 7 output from ISA DMAC 1521 is sent to DS-PCI/ISA bridge device 20 by a serial transfer using the serial GNT# signal line and executed by RGM 1522.

ISA DMAC 1521 preferably performs 82C37 compatible arbitration between DREQ channels, according to setting and adjustment of a DREQ channel mask, based on the most recent DREQ channel information provided from RGM 1522 and IIDR 1523. If there is an effective DMA request (DREQ), ISA DMAC 1521 first activates a REQ# allocated to itself and sends a request for bus access right to PCI bus arbiter (PBA) 151. ISA DMAC 1521 waits for a GNT# to be granted by PBA 151.

If a GNT# is given from PBA 151, ISA DMAC 1521 activates the internal DACK# corresponding to the DMA channel number selected as a result of the arbitration, and the DMA channel number which is the subject of DMA transfer is returned to RGM 1522 and IIDR 1523. Then, ISA DMAC 1521 activates a FRAME# and executes a DMA cycle corresponding to the DMA transfer mode (single transfer mode, block transfer mode, demand transfer mode, cascade mode) regulated by the setup information of the selected DMA channel. In this case, ISA DMAC 1521 supports only bus cycles of internal PCI bus 2 for both memory and I/O cycles as described previously, and the bus cycles of ISA bus 3, 5 are emulated by PCI-ISA bridge device 15 or DS-PCI/ISA bridge device 20.

HOST-PCI bridge device 12 converts the memory cycle generated on internal PCI bus 2 into a DRAM access cycle and executes read/write-access of system memory 13.

Next, the operation of RGM 1522 as shown in FIG. 3 is explained.

RGM 1522 serializes the plurality of DMA channels and manages the states of the serial REQ# and the serial GNT# in order to perform processes relating to the DMA serial channel protocol which is to transfer. RGM 1522 performs conversion between the DMA serial channel protocol and the DREQ/DACK# protocol of the ISA style regarding ISA DMAC 1521.

REQ# signals are input to RGM 1522. Also, the protocol of the REQ# is programmed for each REQ# signal. Consequently, if a number of pairs of REQ# and GNT# signal lines used as serial REQ#s and serial GNT#s are prepared, DMA serial channel protocol is used to receive and transmit DREQs and DACK#s between not only devices on external ISA bus 5, which are performed through DS-PCI/ISA bridge device 20, but also PC cards 61 and 62 of the PC card controller and ISA DMAC 1521.

RGM 1522 converts between DMA serial channel protocol and REQ#/GNT protocol for arbitration of the standard PCI style supported by PBA 151.

In other words, the DMA serial channel protocol is used to receive and transmit not only DREQs and DACK#s with devices on external ISA bus 5, but also REQs and GNT#s with the PCI master on external PCI bus 4. Processing of the REQ#s and GNT#s in this case is performed in the following manner by RGM 1522.

The PCI master, such as LAN board or SCSI board on external PCI bus 4, informs DS-PCI/ISA bridge device 20 of a bus access request by activating the REQ#. DS-PCI/ISA bridge device 20 informs RGM 1522 of the bus access request by serial data transfer by using the serial REQ#. In such a case, notification of the bus access request uses DREQ 4 which is the DMA channel not used by an ISA device.

RGM 1522 decomposes the serial REQ# signal and, upon detecting that the DREQ 4 has been notified by the serial REQ#, activates the REQ# and makes a request to PBA 151 for bus access. PBA 151 arbitrates based upon the standard PCI rule and enables bus access for RGM 1522 by means of a GNT#.

RGM 1522, upon receiving the GNT# from PBA 151, notifies DS-PCI/ISA bridge device 20 by means of serial transfer data using a serial GNT# that bus access was enabled. The DACK 4 is used in this notification. DS-PCI/ISA bridge device 20 decomposes the serial GNT# signal transmitted by RGM 1522 and supplies the GNT# to PCI master 41. The PCI master commences a bus cycle upon receiving the GNT#.

Next, the operation of internal ISA DMA router (IIDR) 1523 is explained.

Internal ISA DMA router (IIDR) 1523 changes a mapped DMA channel to the DMA slaves on internal ISA bus 3, according to programmed mapping information. IIDR 1523 converts the states of DREQ signals from the DMA slaves to internal DREQs corresponding to the DMA channel numbers of these devices, according to mapping information, and sends them to ISA DMAC 1521. Further, IIDR 1523 converts internal DACK#s from ISA DMAC 1521 to DACK#S, which are actually used by the DMA slaves, according to mapping information, and outputs them to internal ISA bus 3.

Internal ISA bus bridge (IIBB) 153 is a bridge LSI for connecting internal PCI bus 2 and internal ISA bus 3, and controls all devices on internal ISA bus 3 such as memories and I/Os. IIBB 153 protocol-converts memory or I/O cycles generated on internal PCI bus 2 for DMA transfer by ISA DMAC 1521, and sends them to internal ISA bus 3.

PCI-DS bridge device 16 is a bridge LSI for connecting internal PCI bus 2 and a docking bus corresponding to the PCI bus leading out to a desk station, and functions as an agent on internal PCI bus 2. A buffer for synchronizing transfer of serial REQ#s/GNT#s by means of DMA serial channel protocol is provided in this PCI-DS bridge device 16.

PC card controller 17 is one PCI bus master and supports DMA serial channel protocol. When PC cards 61, 62 controlled by PC card controller 17 request DMA transfer, the DMA request, i.e. DREQ, is transferred to RGM 1522 by the serial transfer which uses the REQ# signal line allocated to PC card controller 17. Further, a DACK# from RGM 1522 is sent to PC card controller 17 by the serial transfer, which uses the GNT# signal line allocated to PC card controller 17. The serial GNT# is decomposed into a DACK# by PC card controller 17 and passed along to the PC card 61 or 62.

PCI DMA 18 is an agent on internal PCI bus 2 similar to PC card controller 17 and support DMA serial channel protocol. When a DMA slave 19 controlled by the PCI DMA requests DMA transfer, this DMA request, i.e. DREQ, is transmitted to RGM 1522 by a serial REQ#. Also, a serial GNT# from RGM 1522 is decomposed into a DACK# by PCI DMA 18 and informed to DMA slave 19.

DS-PCI/ISA bridge device 20 is a bridge LSI for connecting the docking bus (corresponding to internal PCI bus 2), leading out to the desk station from the main body of the computer via the DS connector, to external PCI bus 4 and external ISA bus 5. DS-PCI/ISA bridge device 20 bi-directionally transmits bus cycles between internal PCI bus 2 and external PCI bus 4, and bi-directionally performs protocol conversion of bus cycles between internal PCI bus 2 and external ISA bus 5. A desk station bus in the desk station is formed by signal line groups corresponding to internal PCI bus 2.

DS-PCI/ISA bridge device 20 is one PCI master similar to PC card controller 17 and supports DMA serial channel protocol.

Figure 4:
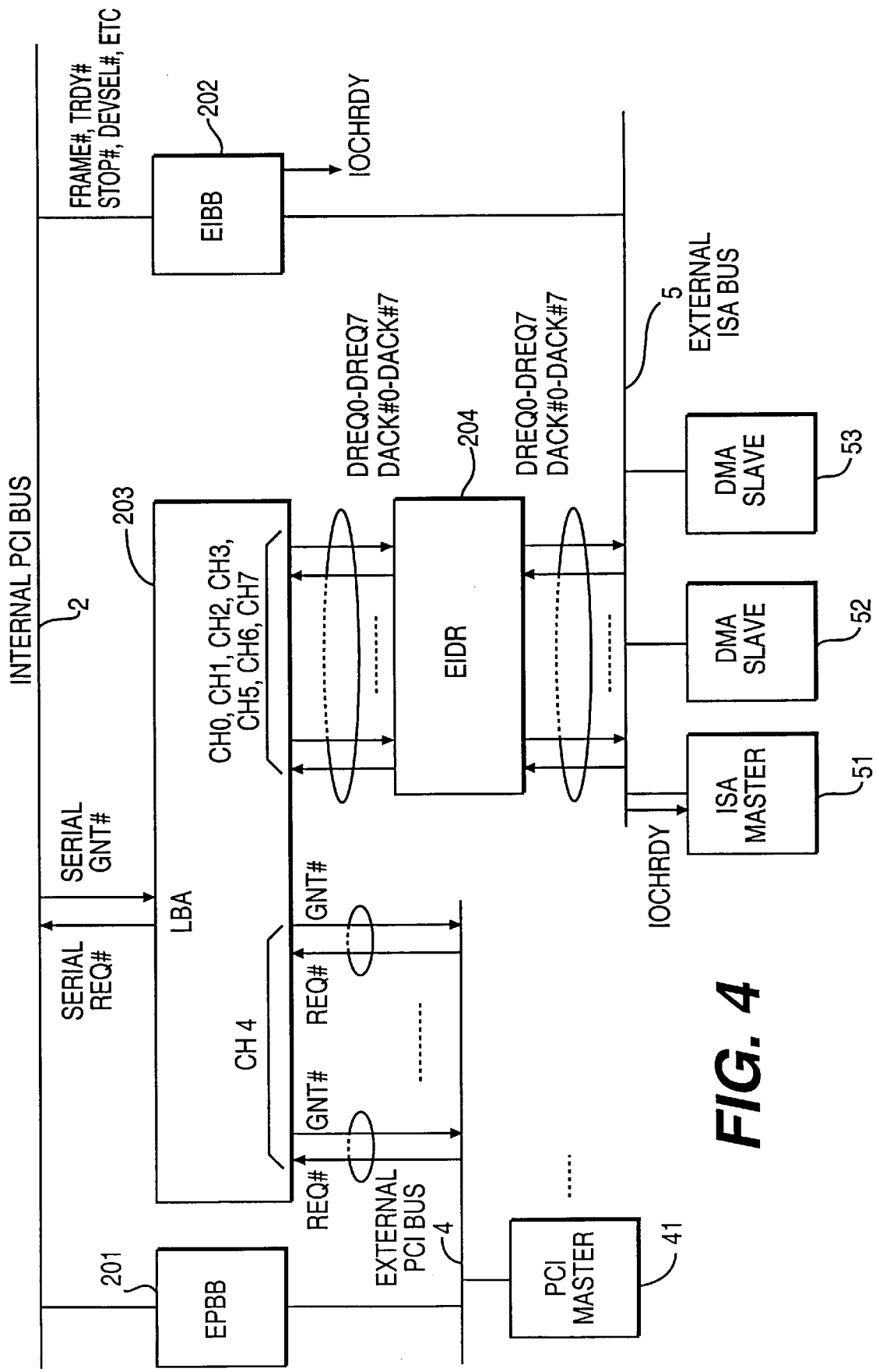
FIG. 4 is a schematic block diagram of a DS-PCI/ISA bridge device in the computer system shown FIG. 2.

DS-PCI/ISA bridge device 20 includes external PCI bus bridge (EPBB) 201, external ISA bus bridge (EIBB) 202, local bus arbiter (LBA) 203 and external ISA DMA router (EIDR) 204. FIG. 4 shows the connection relationships inside DS-PCI/ISA bridge device 20.

EPBB 201 receives through PCI-DS bridge 16 device memory cycles and I/O cycles generated by ISA DMAC 1521 on internal PCI bus 2, and sends them to external PCI bus 4. Further, where a bus access enable is granted to PCI master device 14 on external PCI bus 4, EPBB 201 generates an external PCI bus transaction on the desk station.

EIBB 202 is for bi-directionally performing protocol conversion of bus cycles between internal PCI bus 2 and external ISA bus 5. For example, EIBB 202 receives through PCI-DS bridge device 16 memory cycles and I/O cycles generated by ISA DMAC 1521 on internal PCI bus 2, protocol-converts them, and sends them to external ISA bus 5. Further, where a bus access enable is granted to the ISA master device on external ISA bus 5 and a bus cycle for ISA master device 51 to access a PCI device on internal PCI bus 2 is generated on external ISA bus 5, EIBB 202 converts the bus cycle to a transaction on internal PCI bus 2.

During execution of the transaction, EIBB 202 monitors the signals TRDY#, STOPS and DEVSEL# on internal PCI bus 2 through the desk station bus, and by a combination of these signals (TRDY#=inactive, STOP#=active and DEVSEL#=active), finds whether the target on internal PCI bus 2 address-specified by the transaction can respond to the transaction.

For example, in case HOST-PCI bridge device 12 has been locked by software of the OS, since the Host-PCI bridge device 12 cannot respond to the transaction from ISA master 51 on external ISA bus 5, HOST-PCI bridge device 12 notifies DS-PCI/ISA bridge device 20 of a target retry.

Here, the TRDY# is a signal for reporting that a target has concluded the current data phase and is in a ready state. The STOP# is a signal used by a target to request the initiator to suspend the current transaction. The DEVSEL# is a signal outputted from an address-specified target and indicates that the target has been selected.

When DS-PCI/ISA bridge device 20 has detected a target retry, EIBB 202 imposes a wait on ISA master 51 on external ISA bus 5 by activating an I/O channel ready signal (IOCHRDY) defined on external ISA bus 5. After a certain time period, EIBB 202 automatically retries the same bus cycle as the bus cycle on internal PCI bus 2 which was concluded by the target retry.

The I/O channel ready signal (IOCHRDY) is originally used for a low-speed ISA device to insert a wait cycle over a predetermined value in an ISA bus cycle, but in this embodiment, as described above, it is used to impose a wait on ISA master 51 on external ISA bus 5, when a target retry occurs.

LBA 203 monitors changes in the states of bus access requests REQ# from PCI master 41 on external PCI bus 4 and DREQ signals (basically of the amount of ISA DMA channels) from ISA master 51 and DMA slaves 52,53 on external ISA bus 5, and sends the most recent state through PCI-DS bridge device 16 by serial transfer of a bit string using a serial REQ#.

The format of the bit string transmitted by a serial REQ# is as follows.

```
         S 0 1 2 3 4 5 6 7
REQ#     H,H,H,L,H,L,H,L,H,L,H,L,L, ...
```

LBA 203 takes the leading edge of the activated REQ# as the start bit (S), thereafter by using DMA channels 0 to 7 per each clock frame and sending them in a serial way. The frame of channel 4 is used to send changes in the bus request state of PCI master 41 on external PCI bus 4, while all other channels are used to send changes in the states of DMA requests of ISA master 51 and DMA slaves 52, 53 on external ISA bus 5.

In each frame, "L" is taken to mean that there is no request and "H" is taken to mean that there is a request. In the above example, DREQs 0, 2 and 7 are active and correspond to a state where PCI master 41 on external PCI bus 4 is requesting bus access (DREQ 4 is active).

LBA 203 has two operating states (proceed and freeze). Until it receives a serial GNT# from RGM 1522, LBA 203 is in a proceed state and works to continuously send the most recent state to RGM 1522. In other words, in a proceed state, whenever a change in the state of a REQ# of PCI master 41 on external PCI bus 4 or DREQs of ISA master 51 and DMA slaves 52, 53 on external ISA bus 5 is generated, RGM 1522 is notified by the DMA serial channel protocol.

When a serial GNT# is received from RGM 1522, LBA 203 decodes the bit string in the serial GNT# and either returns a DACK# to the EIDR or returns a GNT# to external PCI bus 4.

The format of the bit string transmitted by the serial GNT# from RGM 1522 is as follows.

```
         S 0 1 2
GNT#     H,H,H,L,H,L,L,L, ...
```

RGM 1522 takes the leading edge of the activated GNT# as the start bit (S). Thereafter RGM 1522 allocates one bit per one clock frame, in sequence from the LSB, information 3-bit encoded from one of the DMA channel DACK#s 0 to 7, and sends it in a serial way. The code of channel 4 is used to send a GNT# corresponding to a bus request state of the PCI master on external PCI bus 4, while all other codes are used to send DACK#s corresponding to DMA requests of ISA master 51 and the DMA slaves on external ISA bus 5.

The above example means that DMA channel 4, which is channel code=4, has been selected (DACK4# has been supplied).

Upon receiving a GNT#, the operating state of LBA 203 is switched from a proceed state to a freeze state. The freeze state is maintained until the device (PCI master 41, ISA master 51 or DMA slaves 52,53) corresponding to the GNT# withdraws its bus access request. At that time, execution of serial REQ# cycles for reporting are frozen, even if changes in the states of other devices occur, and REQ#s continue to be maintained in active states.

In the DMA serial channel protocol of this system, the frame allocated by the use of PCI master 41 is channel 4 only, resulting in a case where a plurality of PCI masters exist on external PCI bus 4, and LBA 203 performs arbitration between REQ#s from the plurality of PCI masters.

EIDR 204 changes mapped DMA channels into ISA master 51 and DMA slaves 52,53 on external ISA bus 5, according to programmed mapping information. In cooperation with EIDR 204 and the previously described IIDR 1523, DMA channels can be exclusively allocated to devices on internal ISA bus 3 and devices on external ISA bus 5.

EIDR 204 changes the state of DREQ signals from each of ISA master 51 and the DMA slaves 52,53 on external ISA bus 5 to DREQ signals corresponding to the DMA channel numbers of these devices, according to mapping information and sends them to LBA 203. Further, EIDR 204 changes DACK#s from LBA 203 into DACK#s actually used by ISA master 51 and the DMA slaves 52,53 on external ISA bus 5, according to mapping information, and outputs them to external ISA bus 5.

Figure 5:
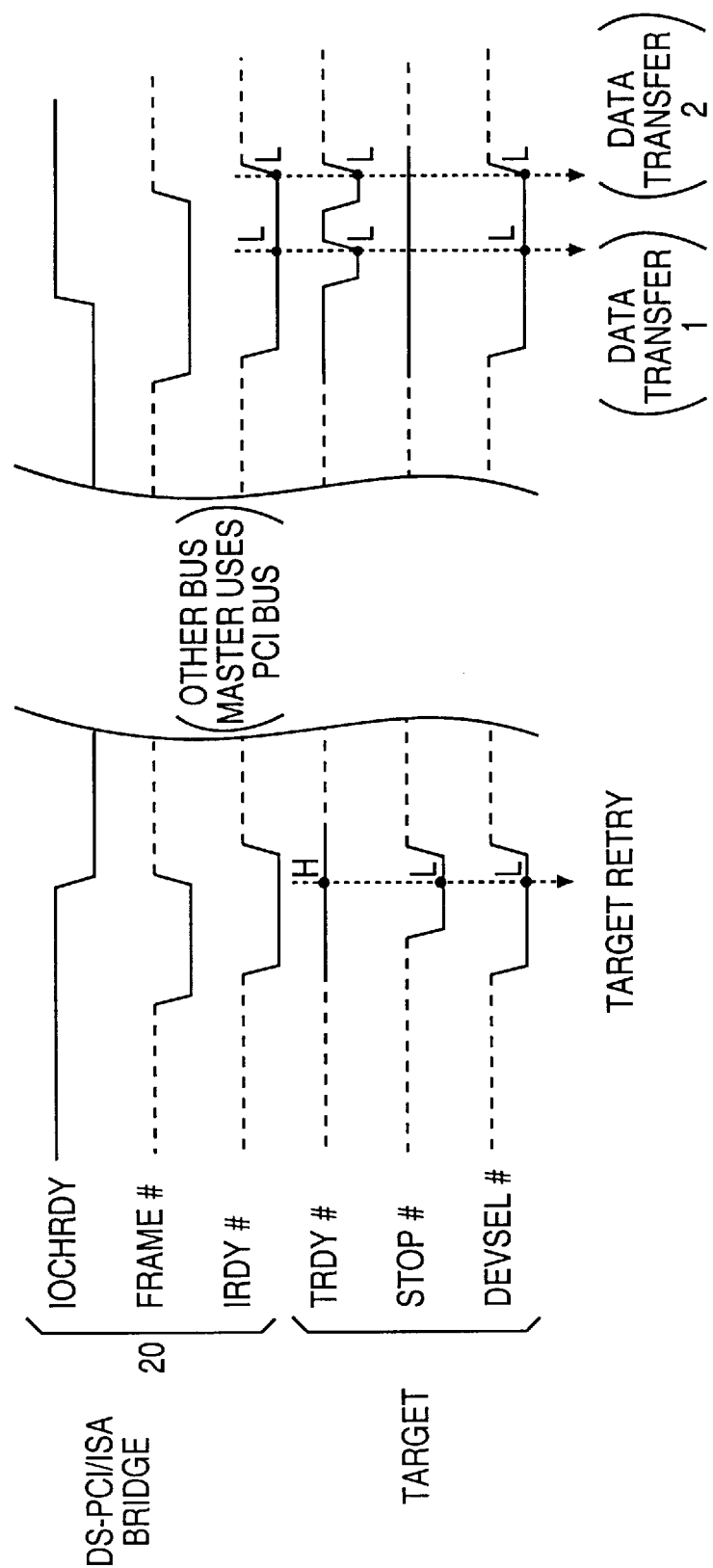
FIG. 5 is a timing chart for the DS-PCI/ISA bridge device showing the operation of a wait process at a time of a target retry.

Next, the operation in the case where DS-PCI/ISA bridge device 20 operates as a bridge for bus cycle conversion from external ISA bus 5 to internal PCI bus 2 is explained, referring to the timing chart in FIG. 5. For example, ISA master 51 operates as a bus master and accesses a PCI device on internal PCI bus 2.

Once ISA master 51 device on external ISA bus 5 generates a DREQ#, this is sent to ISA DMAC 1521 by a serial REQ#. Once ISA DMAC 1521 generates a REQ# with respect to PBA 151 and a GNT# is acquired from PBA 151, ISA DMAC 1521 sends a DACK# to ISA master 51 by a serial GNT#.

After activating a MASTERS signal on external ISA bus 5, ISA master 51 on external ISA bus 5 commences a bus cycle for accessing a PCI device on internal PCI bus 2. In response to this bus cycle, DS-PCI/ISA bridge device 20 activates a frame signal FRAME# and commences a transaction on internal PCI bus 2 as shown in FIG. 5.

At this time, where a target specified by the address outputted from DS-PCI/ISA bridge device 20 cannot respond to the transaction, the target activates a target ready signal TRDY#, a stop signal STOP# and a device select signal DEVSEL# on internal PCI bus 2 as "H", "L" and "L", whereby notifying DS-PCI/ISA bridge device 20 of a target retry.

DS-PCI/ISA bridge device 20 concludes the transaction and temporarily releases internal PCI bus 2. Thereby, it is possible for other PCI bus masters to use internal PCI bus 2. Also, simultaneously, DS-PCI/ISA bridge device 20 renders the IOCHRDY active. The IOCHRDY is sent to ISA master 51 on external ISA bus 5 as a wait request, whereby the bus cycle operation by ISA master 51 on external ISA bus 5 is in a wait state. Then, DS-PCI/ISA bridge device 20 activates the frame signal FRAME# after a lapse of a predetermined clock from when the target retry is reported, and automatically retries the same transaction which has been concluded. If a target retry is not generated in this transaction, DS-PCI/ISA bridge device 20 inactivates the IOCHRDY. Thereby, data transfer between ISA master 51 on external ISA bus 5 and the target on internal PCI bus 2 is executed correctly. The data transfer as shown in FIG. 5 is executed twice.

As described above, in this embodiment, when the bus cycle of ISA master 51 on external ISA bus 5 begins, and a target retry is returned from a PCI device on internal PCI bus 2, ISA master 51 on external ISA bus 5 is in a wait state by activating a signal I/O channel ready (IOCHRDY) line. DS-PCI/ISA bridge device 20 automatically retries the transaction after a predetermined time period has been passed.

Accordingly, misoperation of ISA bus master 51 arising from generation of a target retry can be prevented.

It is noted that in the above mentioned embodiment, a wait process with respect to a case in which ISA bus master 51 on external ISA bus 5 accesses a device on internal PCI bus 2 has been explained, a wait process utilizing an IOCHRDY can be similarly performed also with respect to the case of accessing a device on external PCI bus 4. Also, in a case where the device on internal ISA bus 3 operates as a bus master, a wait process utilizing the IOCHRDY can be applied.

In this invention, when a bus access is enabled in a device (as bus master) on the ISA bus by which a bus cycle for accessing a device on the PCI bus is commenced, the bridge device converts the bus cycle on the ISA bus to a PCI bus cycle and commences a transaction to access the PCI device. At this time, when a target on the PCI bus which is address-specified by the transaction cannot correspond to the transaction, and a target retry is generated by the PCI device, the bridge device temporarily concludes the transaction and imposes a wait on the ISA bus master by using an I/O channel ready signal (IOCHRDY). The I/O channel ready signal is transmitted to the ISA bus master from the bridge device as a wait request. The bus cycle operation by the ISA bus master is made to wait. Thereafter, the bridge device automatically executes the same transaction after a specified time lapse. If the target retry is not generated again, the wait is released by making the I/O channel ready signal inactive and data transfer between the ISA bus master and the PCI bus master is executed.

In this manner, the ISA bus master is made to wait by making the I/O channel ready signal active, and in this state the bridge device automatically retries the transaction, whereby misoperation of the ISA bus master arising from generation of a target retry can be prevented.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. The scope of the invention is defined by the claims and their equivalents.

What is claimed is:

1. Apparatus for processing a target retry, comprising:
   bridge device means, connected to a first bus and a second bus, for converting a bus cycle executed by a bus master on the second bus into a transaction in order to access a target on the first bus;
   wait means, coupled to the bridge device means, for setting the bus master in a wait state when a target retry is notified by the target on the first bus to the bridge device means, wherein during the wait state, the bus master keeps access to the second bus after the bus master releases access to the first bus via the bridge device means; and
   retry means, coupled to the bridge device means, for retrying the transaction during said wait state after a lapse of a predetermined time from retry notification.

2. The apparatus of claim 1, wherein the first bus is a peripheral component interconnect (PCI) bus.

3. The apparatus of claim 2, wherein the second bus is an industry standard architecture (ISA) bus.

4. The apparatus of claim 3, wherein the wait means includes means for resetting the bus master in an active state after a lapse of a predetermined time from retry notification.

5. The apparatus of claim 3, wherein the target is specified by the address of the transaction.

6. The apparatus of claim 3, wherein the wait means includes means for activating an I/O channel ready signal (IOCHRDY) on the ISA bus.

7. The apparatus of claim 3, wherein the wait means includes means for detecting whether a target retry from the target has been notified.

8. The apparatus of claim 7, wherein the detecting means includes means for monitoring a target ready signal (TRDY#), a stop signal (STOP#), and a device select signal (DEVSEL#), driven by a current target on the PCI bus.

9. The apparatus of claim 8, wherein the bridge device includes means for releasing the PCI bus when a target retry has been detected.

10. The apparatus of claim 4, wherein the bus master includes means for activating a master signal (MASTER#) on the ISA bus, and means for commencing a bus cycle on the ISA bus to access the target on the PCI bus.

11. The apparatus of claim 10, wherein the bridge device includes means for converting a bus cycle on the PCI bus into a bus cycle on the ISA bus and means for converting a bus cycle on the ISA bus into a bus cycle on the PCI bus.

12. The apparatus of claim 11, wherein the bridge device includes LBA means for activating a bus access request signal (REQ#) allocated therein on the PCI bus in a serial data transfer way.

13. The apparatus of claim 12, wherein the bridge device includes means for, when a bus access enable signal (GNT#) allocated therein is asserted, activating a frame signal (FRAME#) on the PCI bus to commence a transaction.

14. A computer system having a computer main body and an expansion unit detachably connected to the computer main body and in which various types of expansion devices are installable, the computer system comprising:
   a bridge device implemented in the expansion unit and connected to a PCI bus in the computer main body and to an ISA bus in the expansion unit, for converting a bus cycle executed by a bus master on the ISA bus into a transaction in order to access a target on the PCI bus;
   wherein the bridge device includes a retry means for setting the bus master in a wait state when a target retry is notified by the target on the PCI bus specified by the address of the transaction to the bridge device, wherein during the wait state, an I/O channel ready signal (IOCHRDY) is activated to set the bus master in the wait state, the bus master keeps access to the ISA bus after the bus master releases access to the PCI bus via the bridge device, and the retry means retries the transaction after a lapse of a predetermined time.

15. A method of processing a target retry from a target on a first bus, when a bus master on a second bus accesses the target on the first bus through a bridge device connected to the first bus and the second bus, for converting a bus cycle executed by the bus master into a transaction, the method comprising the steps of:
   commencing a transaction by the bus master on the second bus to access a target on the first bus;
   setting the bus master in a wait state when a target retry is notified by the target on the first bus to the bridge device, wherein during the wait state, the bus master keeps access to the second bus after the bus master releases access to the first bus via the bridge device; and
   retrying the transaction during said wait state after a lapse of a predetermined time from the retry notification.

16. The method of claim 15, wherein the commencing step includes a step of activating a master signal (MASTER#) to generate the bus cycle on the second bus.

17. The method of claim 16, wherein the commencing step includes a step of asserting a frame signal (FRAME#) to begin the transaction on the first bus.

18. The method of claim 15, wherein the setting step includes a step of activating an I/O channel ready signal (IOCHRDY) on the second bus.

19. The method of claim 18, wherein the setting step includes a step of detecting whether the target retry from the target has been notified.

20. The method of claim 19, wherein the detecting step includes a step of monitoring a target ready signal (TRDY#), a stop signal (STOP#) and a device select signal (DEVSEL#) driven by a current target on the first bus.

21. The method of claim 20, further comprising the step of releasing the first bus when the target retry has been detected.

* * * * *